United States Patent [19]

Inoue et al.

[11] Patent Number: 5,550,209
[45] Date of Patent: Aug. 27, 1996

[54] MONODISPERSED POLYMER OR COPOLYMER AND A PREPARATION PROCESS THEREOF

[75] Inventors: Shohei Inoue, Tokyo-to; Takuzo Aida; Masaki Akatsuka, both of Kashiwa, all of Japan

[73] Assignee: Daicel Chemical Industries, Ltd., Osaka-fu, Japan

[21] Appl. No.: 395,889

[22] Filed: Feb. 28, 1995

[30] Foreign Application Priority Data

Mar. 4, 1994 [JP] Japan ................... 6-060368
Jan. 31, 1995 [JP] Japan ................... 7-034424

[51] Int. Cl.$^6$ .................. C08G 63/84; C08G 63/91; C08G 64/00
[52] U.S. Cl. .................. 528/361; 525/415; 525/461; 528/196; 528/354; 528/357
[58] Field of Search ................... 528/354, 357, 528/361, 196; 525/408, 413, 415, 461

[56] References Cited

U.S. PATENT DOCUMENTS 5,095,098 3/1992 McLain et al. ................... 534/15
B1 5,028,667 2/1993 McLain et al. ................... 525/415

Primary Examiner—Shelley A. Dodson
Attorney, Agent, or Firm—Morgan & Finnegan

[57] ABSTRACT

Disclosed are a lactone polymer, a carbonate polymer, a lactone-carbonate random or block copolymer which are mono-dispersed, that is, which have a molecular weight distribution of nearly 1, or, in which purity of a polymer component having a unitary structure is very high, and processes for the preparation thereof which comprise a ring-opening addition reaction of a lactone monomer and/or a cyclic carbonate monomer with a ring-opening initiator in the presence of an organic aluminum-based Lewis acid represented by general formula (I),

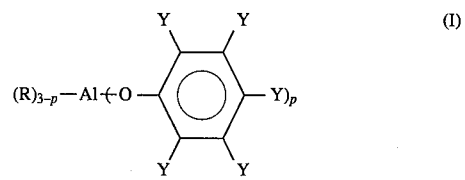

wherein R is an alkyl group having a carbon number ranging from 1 to 4, Y is independently selected from a substituted group, and p is any one of 1, 2 and 3.

10 Claims, 5 Drawing Sheets

MONODISPERSED POLYMER OR COPOLYMER AND A PREPARATION PROCESS THEREOF

FIELD OF THE INVENTION

The present invention relates to a lactone polymer, a carbonate polymer and a lactone-carbonate block copolymer, and a lactone-carbonate random which are monodispersed, that is, which have a molecular weight distribution of nearly 1, or in which the purity of a polymer component having a unitary structure is very high. Furthermore, the present invention relates to a process for the preparation thereof.

In more detail, the present invention relates to monodispersed polymers or copolymers which can be preferably employed in uses such as starting materials for polyurethanes or coatings, and a modifier for resins in which there are required high added-values and advanced performance, and relates to the process for the preparation thereof.

BACKGROUND OF THE INVENTION

Ring-opening polymerization of lactones or cyclic carbonates is broadly divided into two categories of polymerization. The former is anionic polymerization in which organo-metallic compounds are generally employed as an initiator.

The latter is polymerization in which there are employed compounds having at least one active hydrogens such as water and alcohols which are initiators in the presence of various Lewis acids in a broad sense, which are catalysts.

In the anionic polymerization, there are employed n-butyl lithium, tert-butoxy potassium, sodium methoxide, and rare earth metal complexes, as the organometallic compounds which are initiators.

Specifically, Japanese Patent Unexamined Publication (hereinafter, referred to as Kokai) No. 37737/1971 discloses a polystyrene-polycarbonate block copolymer and the like, Kokai No. 294326/1990 (EP-A-392251) discloses a polycaprolactone-polyneopentylglycol carbonate block copolymer and the like, and further Kokai No. 500982/1993 (corresponding to U.S. Pat. Nos. 5,028,667 and 5,095,098) and Kokai No. 247184/1993 disclose processes for the preparation of polycaprolactones in which rare earth metal complexes are employed.

In the anionic polymerization processes, there is a strong point in that there can be prepared a polymer or block copolymer having a narrow molecular weight distribution by carrying out a particular reaction process in which solvents and cyclic monomers to be employed are very strictly refined.

As catalysts in the latter polymerization processes, there are exemplified various Lewis acids in a broad sense such as sulfuric acid, p-toluene sulfonic acid, quaternary ammonium salts, boron trifluorides, stannous tetrachloride, trialkyl aluminum, tetrabutyl titanate, and dibutyl tin oxide, and the like. Lewis acids have a function capable of accelerating nucleophilic property in initiators such as water and alcohols together with lowering the energy required in the ring-opening reaction of lactone monomers or cyclic carbonate monomers.

In the ring-opening reaction, although water or alcohols are employed as an initiator, they also act as a reaction terminator and a chain transfer agent, resulting in it being considerably difficult to prepare a polymer or copolymer having a narrow molecular weight distribution in comparison to a polymer prepared by an anionic polymerization.

In Macromolecules, 20, 2982–2988 (1987), Inoue and Aida et al, have reported a process in which a monodispersed lactone polymer can be prepared as an example of a polymer or block copolymer having a particularly narrow molecular weight distribution.

In the report, it is described that there can be prepared a caprolactone polymer having a number average molecular weight ranging from 1,100 to 10,400 and a molecular weight distribution ranging from 1.10 to 1.16 which are measured with a GPC method in the presence of aluminum porphyrin complexes as a catalyst. It is to be noted that the terminology "immortal polymerization" is used in the report.

Furthermore, in Macromolecule Chemistry (Macromolecule Symposium) 42/43, 117–133 (1991), Okamoto has reported a process in which there can be prepared a polylactone diol polymer having a number average molecular weight of 3,000 or so and a molecular weight distribution ranging from 1.25 to 1.31 which are measured with a GPC method in the presence of ethylene glycol as an initiator and triethyloxonium hexafluorophosphonate as a catalyst.

Still further, Japanese Patent Examined publication (Kokoku) No. 56251/1991 discloses that polymers having a molecular weight distribution ranging from 1.54 to 1.76 which are measured with a GPC method in the presence of ethylene glycol as an initiator and halogenated stannous compounds in comparison with polymers prepared using conventional tetrabutyl titanate as a catalyst.

In addition, EP-A-0600417 discloses a process for the preparation of hydroxy-terminated linear carbonates having molecular weight distribution ranging from 1.7 to 2.1 by the reaction of polyvalent alcohols or hydroxy alkyl(meth)acrylates with cyclic carbonates in the presence of a catalyst selected from a Bronsted acid, an onium salt thereof, a strongly acidic ion exchange resin, an alkyl alkali metal, an alkali metal alkoxide, an amine, a tin compound, a tungsten compound, a titanium compound, and a zinc compound.

In the meantime, there have been desired a lactone polymer, carbonate polymer, and copolymer thereof having a narrow molecular weight distribution or a very high content of a (co)polymer component having a unitary structure in fields such as modifiers for resins, coatings, surface modifiers, adhesives, and pressure-sensitive adhesives, etc. In the fields, applications requiring a high added-value and an advanced performance in products have been recently increasing.

However, in an anionic polymerization process for the purpose of preparing a lactone polymer, carbonate polymer, and copolymer thereof having a specified structure, there must be employed a large amount of an organometallic compound as an initiator. As a result, there occur various problems that it is difficult to thermally control polymerization, and residual metallic components considerably deteriorate the thermal stability in the polymers, resulting in an adverse influence from the viewpoint of economy.

Specifically speaking, it is remarkably difficult to prepare a lactone polymer modified by a methacrylic group in which 2-hydroxyethylmethacrylate is allowed to react with from 1 to 5 mol of caprolactone according to single-stage anionic polymerization, resulting in an adverse influence from the viewpoint of economy.

Furthermore, in the above-described process in which aluminum porphyrin complexes are employed, it requires more than 10 days for preparation of the above-described caprolactone polymer and, further, the polymer obtained colors remarkably because the reaction rate is slow, resulting in it not being practical.

Still further, in the above-described process in which triethyloxonium hexafluorophosphonates are employed, it requires 24 hours at 30° C. for preparing the above-described caprolactone diol polymer and, further, 5% or so of the lactone monomer remains. In the case when it is intended to raise the conversion of the lactone monomer to nearly 100%, it is a problem that the molecular weight distribution value may broaden.

SUMMARY OF THE INVENTION

It is an object of the present invention to provide a monodispersed lactone polymer, a monodispersed carbonate polymer, and a monodispersed lactone-carbonate copolymer and a process for the preparation thereof.

A first aspect of the present invention relates to a process for the preparation of any one of a monodispersed lactone polymer, a monodispersed carbonate polymer, and a monodispersed lactone-carbonate copolymer which comprises the ring-opening addition reaction of a lactone monomer and/or a cyclic carbonate monomer with a ring-opening initiator in the presence of an organic aluminum-based Lewis acid represented by general formula (I),

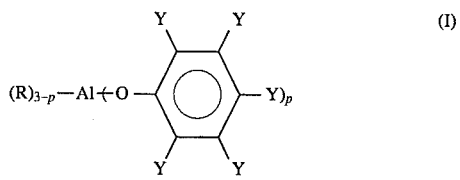

wherein R is an alkyl group having a carbon number ranging from 1 to 4, Y is independently selected from a substituted group, and p is any one of 1, 2, and 3.

A second aspect of the present invention relates to a monodispersed (co)polymer having a plurality of hydroxyl groups represented by general formula (III),

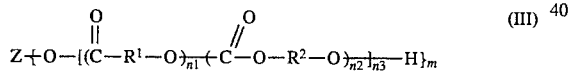

wherein $R^1$ is

k is an interger ranging from 4 to 8, $R^2$ is an alkylene group having a carbon number ranging from 1 to 10, n1 and n2 are an integer ranging from 0 to 100 which are not simultaneously 0, n3 is an integer ranging from 1 to 10, m is an integer ranging from 2 to 10, and z is a residual group of a polyvalent alcohol having functionality of m.

A third aspect of the present invention relates to a (meth-)acrylic-modified monodispersed lactone and/or carbonate (co)polymer having one hydroxyl group represented by general formula (IV),

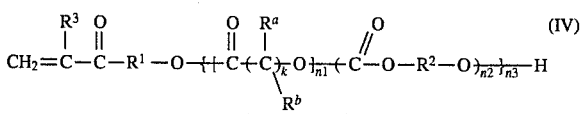

wherein $R^3$ is a hydrogen or methyl, $R^a$ and $R^b$ are independent hydrogen or a methyl group, k is an integer ranging from 4 to 8, $R^1$ and $R^2$ are an alkylene group having a carbon number ranging from 1 to 10, n1 and n2 are an integer ranging from 0 to 100 which are not simultaneously 0, and n3 is an integer ranging from 1 to 10.

DETAILED DESCRIPTION OF THE INVENTION

Figure 1:
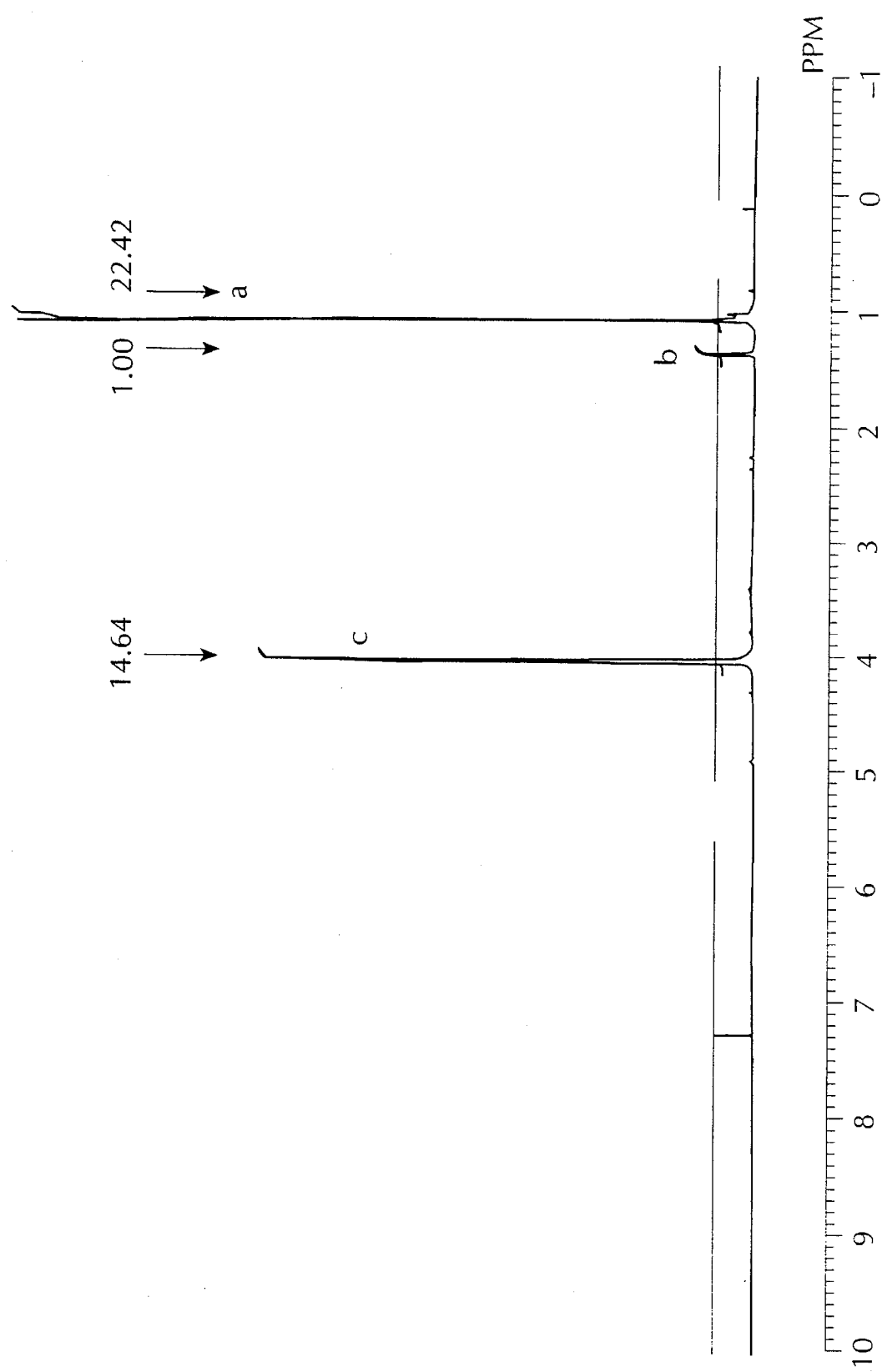
FIG. 1 is a $^1$H-NMR spectra chart related to the carbonate polymer obtained in Example 1.

The present invention will be described hereinafter in more detail.

According to a first aspect of the present invention, there is provided a process for the preparation of any one of a monodispersed lactone polymer, a monodispersed carbonate polymer, and a monodispersed lactone-carbonate copolymer which comprises a ring-opening addition reaction of a lactone monomer and/or a cyclic carbonate monomer with a ring-opening initiator in the presence of an organic aluminum-based Lewis acid represented by general formula (I),

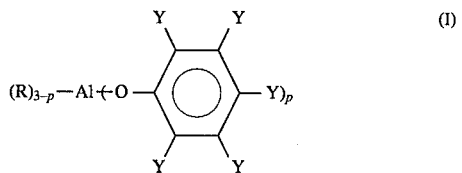

wherein R is an alkyl group having a carbon number ranging from 1 to 4, Y is independently selected from a substituted group, and p is any one of 1, 2, and 3.

It is noted that the terminology "monodispersed" in the present invention is defined as described below.

That is, in the case when a lactone monomer and/or a cyclic carbonate monomer are employed in a molar ratio ranging from 1 to 10 based on an initiator or in the case when the number average molecular weight of a polymer or copolymer is less than 1000, the content of a (co)polymer component having a unitary structure [an adduct in which a monomer(s) is introduced into a ring-opening initiator in a molar ratio as employed] is not less than 50% preferably 70%, and more preferably 90% based on the total components by a measurement with gel permeation chromatography (hereinafter, referred to as GPC). Further, in the case that the number average molecular weight of a polymer or copolymer is not less than 1000, it is a unimodal polymer or copolymer and it has a value of a weight average molecular weight/number average molecular weight (hereinafter, referred to as the molecular weight distribution) ranging from 1.0 to 1.5, preferably 1.0 to 1.2, and more preferably 1.0 to 1.1 as determined by measurement using GPC.

Initiators in the present invention include a compound having at least one active hydrogen atoms such as a hydroxyl group, amino group, carboxylic group, thiol group, and an active methylene group put between at least two electron-attractive groups in the molecule.

These are generally aliphatic alcohols and aliphatic polyvalent alcohols. More specifically, there are exemplified methanol, ethanol, isopropanol, ethyleneglycol, diethyleneglycol, butanediol, hexamethyleneglycol, neopentyl glycol, trimethylolpropane, pentaerythritol, 2-hydroxyethyl(meth)-acrylate, 4-hydroxybutyl(meth)acrylate, allylalcohol, a polyvinylalcohol, a 2-hydroxyethyl(meth)acrylate-modified polymer, and an adduct of ethylene oxide to bisphenol A, and the like.

As lactone monomers in the present invention, there can be generally employed publicly known lactones and, specifically, delta-varelo-lactone, epsilon-caprolactone, and an alkylated lactone thereof are preferably employed from a general or practical point of view. Of these, epsilon-caprolactone is preferably employed because it is manufactured industrially.

One or more of the lactone monomers may be employed.

As cyclic carbonate monomers, there can be preferably employed propylglycol carbonate, 2-methylpropylglycol carbonate, neopentyl glycol carbonate, and the like.

One or more of the cyclic carbonate monomers may be employed.

Furthermore, lactone monomers and cyclic carbonate monomers may be also employed as an admixture to prepare a copolymer. The lactone monomers, the cyclic carbonate monomers, and the admixture thereof are employed in a molar ratio ranging from 1 to 10,000, preferably from 1 to 5,000, and more preferably from 1 to 1,000 based on 1 mol of initiators.

In the case when the molar ratio exceeds 10,000, the ring-opening reaction rate would become slow and the mono-dispersed polymers or copolymers cannot be prepared, resulting in their not being preferred.

In order to efficiently prepare the monodispersed polymers or copolymers, the above-described molar ratio ranging from 1 to 1,000 is preferred. The organic aluminum-based Lewis acid in the present invention is represented by above-described general formula (I).

In general formula (I), R is an alkyl group having a carbon number ranging from 1 to 4, Y is independently selected from a substituted group, and p is any one of 1, 2, and 3.

The alkyl group R specifically includes the methyl group, ethyl group, n-propyl group, iso-propyl group, n-butyl group, iso-butyl group, and tert-butyl group. Specific examples of the substituted group Y independently include hydrogen, an alkyl group such as a methyl group, ethyl group, butyl group, and tert-butyl group, and the like, an aryl group such as the phenyl group, and the like, a halogen such as fluorine, chlorine, and iodine, and the like, a trimethylsilyl group, and a trimethylgelmil group, and the like.

P is any one of 1, 2, and 3. In the case when p is 1, although the ring-opening addition reaction rate of the cyclic monomers becomes large, there is exhibited a tendency in broadening of the molecular weight distribution of the polymer or copolymer and further, in the case when p is 3, it is difficult to prepare catalysts, resulting in that p is most preferably 2.

The organic aluminum-based Lewis acid in the present invention represented by above-described general formula (I) can be prepared by a reaction of an alkylphenol such as 2,6-diphenylphenol, 2,6-ditert-butyl-4-methylphenol, and 2,4,6-trichlorophenol, 2,4,6-tritert-butylphenol, etc. with a trialkylaluminum such as tri-methylaluminum and triisobutyl-aluminum, etc.

In the reaction, an excessive amount of alkylphenol is allowed to react with the trialkylaluminum, specifically, in a molar ratio ranging from 5/1 to 1/1, preferably from 2.5/1 to 2/1. The reaction is preferably carried out in a temperature ranging from 0° C. to room temperatures.

The organic aluminum-based Lewis acid is obtained in the state of a white-colored crystalline after washing with an inert solvent such as hexane or in the state of a solution thereof.

In the present invention, an organic aluminum-based Lewis acid represented by general formula (II) as described below is preferably employed.

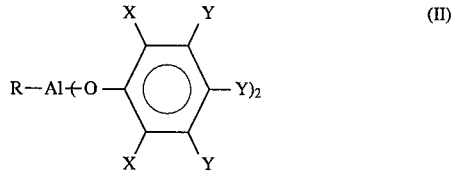

In the formula (II), R is an alkyl group having a carbon number ranging from 1 to 4, X is independently selected from the tert-butyl group, phenyl group, chlorine, bromine, and iodine. Y is independently any substituted group.

In the case when X is the above-described substituted group such as a hydrogen and methyl group, the catalysts are not sterically hindered so much by each other and, as a result, associability appears and the coordinating effect is decreased by the lactone monomer, the cyclic carbonate monomer, and the admixture thereof to the catalysts, resulting in a condition under which a highly monodispersed polymer or copolymer can be preferably prepared.

The organic aluminum-based Lewis acid represented by general formula (I) is employed in a molar ratio ranging from 0.0001 to 1, preferably from 0.001 to 0.5, more preferably from 0.05 to 0.2 based on 1 mol of the initiators. In the case when the molar ratio is less than 0.0001, the ring-opening reaction of the cyclic monomers is slow, and in the case when it exceeds 1, it is meaninglessly only excessive in a practical manner.

In the process for the preparation of the monodispersed lactone polymer, carbonate polymer, and lactone-carbonate copolymer of the present invention, there are preferably refined lactone monomers, cyclic carbonate monomers, admixture thereof, and the organic aluminum-based Lewis acid as purely as possible, thereby enabling side reactions to be controlled.

For the same reason, improved apparatuses for the preparation are preferably employed so that the mixing of moisture and other impurities into starting materials can be prevented.

The total amount of the above-described impurities including moisture is desirably controlled within an amount of less than 5,000 ppm, preferably less than 500 ppm, and more preferably less than 50 ppm based on the total amount of starting materials. In the process of the present invention, solvents may also be employed.

As specific examples of solvents, there are exemplified aliphatic hydrocarbons such as hexane, heptane, cyclohexane, and the like, aromatic hydrocarbons such as benzene, toluene, xylene, and the like, and halogenated hydrocarbons such as chloroform, dichloromethane, and the like which do not have an active hydrogen atom such as hydroxyl group.

The solvents may be preferably employed in an appropriate amount without any limitations.

The initiators, lactone monomers, and/or cyclic carbonate monomers which are the starting materials in the present invention, catalysts, and optional solvents may be fed into a reaction vessel in any order without any limitations for methods to be fed.

It is to be noted that, when a lactone monomer and a carbonate monomer are allowed to react with an initiator at the same time, a random copolymer can be prepared, and, when either monomer is firstly charged for carrying out a polymerization, and then another monomer is secondly charged after polymerization was completed, a block copolymer can be prepared.

A reaction may be carried out at temperatures ranging from 0° to 200° C., and preferably from room temperatures to 180° C. or so. Even in the case when the reaction is carried out at more than 180° C., although the molecular weight distribution in polymers or copolymers obtained does not broaden so much, the reaction rate is unpreferably lowered at temperatures higher than the initiation of decomposition of the organic aluminum-based Lewis acid.

On the contrary, even the reaction is carried out at temperatures lower than room temperatures, although no particular problems occur, the reaction rate would unpreferably lower without any advantages.

The reaction is not particularly limited by other conditions except the above-described conditions.

In the present invention, as the ring-opening reaction of cyclic monomers proceeds in the manner of "living polymerization", polymers or copolymers produced are monodispersed in spite of the state of the presence of residual cyclic monomers in the system. Accordingly, there may be also carried out a method in which an excessive amount of the cyclic monomer is charged in advance, and the unreacted cyclic monomer is separated after attaining the desired polymerization ratio.

Furthermore, an organic aluminum-based Lewis acid which is a catalyst may also be optionally separated from polymers or copolymers produced after the completion of the ring-opening addition reaction.

As methods for separating, there are exemplified solvent separation, absorption, distillation or evaporation at reduced pressures, and filtration, and the like. In the solvent separation process, there can be carried out all of the methods in which the difference in solubility between polymers or copolymers produced and the organic aluminum-based Lewis acid is applied. In the absorption process, there can be carried out chromatography in which there are employed substrates such as activated carbon, silica gel, alumina, graphite, a polymer having hydroxyl group, amino group, carboxylic group, and sulfoxide group, and the like, and a porous ceramic, and, further, an electrophoresis method. Distillation or evaporation at reduced pressures is an appropriate separation process in the case of a resulting lactone polymer having a low molecular weight.

Furthermore, as filtration processes, a membrane process can be applied using the difference in molecular sizes.

According to a second aspect of the present invention, there is provided a monodispersed polymer or copolymer having a plurality of hydroxyl groups represented by general formula (III),

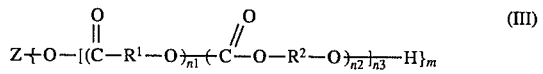

wherein $R^1$ is

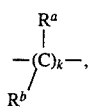

k is an integer ranging from 4 to 8, $R^a$ and $R^b$ are an independent hydrogen or methyl group, and $R^2$ are an alkylene group having a carbon number ranging from 1 to 10, n1 and n2 are an integer ranging from 0 to 100 which are not simultaneously 0, n3 is an integer ranging from 1 to 10, m is an integer ranging from 2 to 10, and Z is a residual group of a polyvalent alcohol having the functionality of m.

In formula (III), in the case when n3 is larger, the polymer or copolymer would become a random type and, in the case when n3 is smaller, the polymer or copolymer would become a block type.

The polymer or copolymer having a plurality of hydroxyl groups represented by general formula (III) of the present invention has at least two hydroxyl groups at terminals in the molecule, which is characterized by being monodispersed, and which includes a lactone polymer, a carbonate polymer, and a lactone-carbonate block or random copolymer.

Hitherto, a polymer having at least two hydroxyl groups at terminals in the molecule has been employed as one of the starting materials for polyurethanes and the like.

However, there have been problems in that workability was low in the preparation of polyurethanes, and properties and outer appearance thereof lowered because of cyclic dimers and polymers produced by dimerization or polymerization of the cyclic monomers together with a broad molecular weight distribution. As mentioned hereinabove, the present invention relates to the lactone polymers having molecular weight distribution ranging from 1.0 to 1.5, and not containing cyclic dimers, that is, which have a high purity, and relates to the various monodispersed polycarbonate polymers, lactone-polycarbonate random, or block copolymers.

It is to be noted that the above-described Macromolecule Chemistry (Macromolecule Symposium) 42/43, 117–133 (1991) discloses lactone polymers having molecular weight distribution ranging from 1.25 to 1.31 prepared by the use of triethyl-oxonium hexafluorophosphonate as a catalyst, and the above-described Kokoku No. 56251/1991 discloses lactone polymers having a molecular weight distribution ranging from 1.54 to 1.76 prepared by the use of halogenated stannous compounds compared to conventional tetrabutyltitanate as a catalyst.

In general formula (III), $R^1$, that is $R^a$, $R^b$ and k depend upon the lactone compound to be employed, for example, in the case when ε-caprolactone is employed, $R^a$ and $R^b$ are hydrogen, and k is 5. $R^Z$ is any one of a trimethylene group, 2-methyltrimethylene group, 2,2-dimethyltrimethylene group, and tetramethylene group which depends upon a cyclic carbonate monomer to be employed, for example, in the case when neopentylglycol carbonate is employed, $R^2$ is $-CH_2C(CH_3)_2CH_2-$.

In general formula (III), n1 and n2 are an integer ranging from 0 to 100, preferably ranging from 5 to 50 which are not simultaneously 0, n3 is an integer ranging from 1 to 10, preferably ranging from 1 to 5, and m is 2, 3, or 4.

Z is a residual group of a polyvalent alcohol which includes ethylene glycol, diethyleneglycol, butanediol, hexamethylene glycol, neopentyl glycol, trimethylol propane, pentaerythritol, a polyvinylalcohol, a 2-hydroxyethyl-(meth)acrylate polymer, a 2-hydroxybutyl(meth)acrylate polymer, and an adduct of ethylene oxide to bisphenol A, and the like.

In the case when the monodispersed polymer or copolymer having a plurality of hydroxyl groups in the present invention is employed as starting materials for polyurethanes, the molecular design is easy because of the narrow molecular weight distribution and a minor amount of impurities, resulting in the capability of preparing polyurethanes having improved properties and outer appearance, and improving workability in manufacturing. More specifically, it is anticipated that (1) polyurethanes having a higher molecular weight can be designed; (2) polyurethanes having an improved modulus, ductility, and thermal stability can be obtained; (3) polyurethanes having an improved fluidity and processability in molding can be obtained; (4) polyurethanes having an excellent color hue and gloss and not causing bleeding and roughness on the surface can be obtained; and (5) molding or preparation machines are not choked or plugged with burnt polymers, etc.

As other conditions for the preparation of the (co)polymer represented by general formula (III), that is, the molar ratio of the initiators to monomers, catalysts, the amount thereof, polymerization temperatures, and separation processes, there may be applied the same conditions as described in the first aspect of the present invention.

According to a third aspect of the present invention, there is provided any one of a (meth)acrylic-modified monodispersed lactone polymer, a (meth)acrylic-modified monodispersed carbonate polymer, and a (meth)acrylic-modified monodispersed lactone-carbonate copolymer having one hydroxyl group represented by general formula (IV),

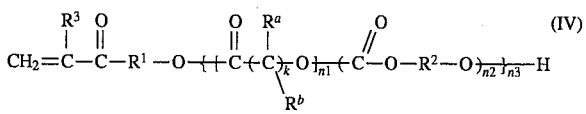

wherein $R^3$ is a hydrogen or methyl, $R^a$ and $R^b$ are independent hydrogen or a methyl group, k is an integer ranging from 4 to 8, $R^1$ and $R^2$ are an alkylene group having a carbon number 8, ranging from 1 to 10, n1 and n2 are an integer ranging from 0 to 100 which are not simultaneously 0, and n3 is an integer ranging from 1 to 10.

In formula (IV), in the case when n3 is larger, the polymer or copolymer would become a random type and, in the case when n3 is smaller, the polymer or copolymer would become a block type.

In general formula (IV), $R^1$ is an alkylene group having a carbon number ranging from 1 to 10, specifically an ethylene group, trimethylene group, tetramethylene group, pentamethylene group, and hexamethylene group.

Specific examples of unsaturated compounds having the alkylene group $R^1$ include 2-hydroxyethyl (meth) acrylate, 2-hydroxypropyl (meth) acrylate, and 4-hydroxybutyl (meth) acrylate, etc.

In general formula (IV), $R^2$ is an alkylene group having a carbon number ranging from 1 to 10, specifically a trimethylene group, 2-methyltrimethylene group, 2,2-dimethyltrimethylene group, or tetramethylene group which depends upon the cyclic carbonate monomer to be employed.

It is to be noted that air or oxygen is preferably employed in the preparation of the (meth)acrylic-modified (co)polymers in order to prevent radical polymerization of the starting hydroxyalkyl (meth) acrylate and the resulting (co)polymer.

In general formula (IV), in the case when n1 is 0 and n2 is not 0, there is provided a (meth)acrylic-modified monodispersed carbonate polymer represented by general formula (V),

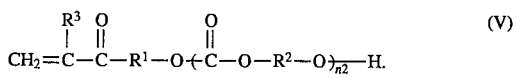

In general formula (IV), in the case when n1 is not 0 and n2 is 0, there is provided a (meth)acrylic-modified monodispersed lactone polymer represented by general formula (VI);

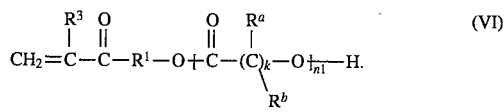

In general formulae (IV), (V), and (VI), n1, n2, or n1+n2 is preferably from 1 to 10, respectively, because a (meth)acrylic-modified (co)polymer having n1, n2 or n1+n2 more than 10 is not so much employed in specific applications.

The (meth)acrylic-modified (co)polymers of the present invention are characterized in that n1, n2, or n1+n2 is in highly good order in above-described general formulae (IV), (V), or (VI).

Further, for example, as disclosed in Japanese Patent Examined Publication (Kokoku) Nos. 66307/1988 and 25322/1989 [corresponding to U.S. Pat. No. 4,916,254], conventional (meth)acrylic-modified lactone polymers have widely distributed n values.

That is, polymers are admixtures composed of (meth) acrylic-modified lactone polymers having different molecular weights.

The (meth)acrylic-modified (co)polymers of the present invention are monodispersed, and thereby there can be minutely controlled physical and chemical properties in products such as starting materials for coatings and modifiers for polymers, and further reactivity and workability in manufacturing the products are exceedingly fine.

As other conditions for the preparation of the (meth)-acrylic-modified (co)polymer represented by general formula (IV), that is, the molar ratio of the initiators to monomers, catalysts, the amount thereof, polymerization temperatures, and separation processes, there may also be applied the same conditions as described in the first aspect of the present invention.

Also in the third aspect, it is to be noted that when a lactone monomer and a carbonate monomer are charged at the same time, a random copolymer can be prepared, and, when either one monomer is charged to carried out polymerization, and then another monomer is charged after the polymerization was completed, a block copolymer can be prepared.

If the monodispersed (meth)acrylic-modified (co)polymers of the present invention are employed, for example, in fields of coatings as described in the Japanese Patent Kokoku No. 25322/1989 in which styrene, methylmethacrylate, and a (meth)-acrylic-modified lactone polymer are employed as resins for coatings, the following three advantages would be newly provided; (1) for example, in the case when a cured coating layer is formed by the above-described radical copolymer and polyvalent isocyanates, the coating layer is excellent in properties of the coating layer, for example, modulus, flexibility, weatherability, scratch resistance, low temperature resistance, and workability in coating, etc., because of an averaged reactivity of terminated hydroxyl groups in the (meth)acrylic-modified lactone polymer, resulting in forming a high crosslinked density and forming a coating layer having averaged cross-linked structures; (2) various properties such as radical polymerizability, storage stability, and crystallization temperatures, etc. can be definitely adjusted which affect physical and chemical properties in the (meth)acrylic-modified (co)polymers; (3) amounts of impurities are exceedingly minor.

The present invention is illustrated below by Examples and Comparative Examples.

<Preparation Example 1: No. 1 preparation of an organic aluminum-based Lewis acid>

2,6-ditert-butyl-methylphenol (2.76 g, 12.5 millimol) was dissolved into 10 ml of dried hexane, and then trimethylaluminum (0.6 ml, 6.25 millimol) was added dropwise at 0° C. to obtain a suspension. The suspension obtained was heated to 60° C. in order to dissolve it. After the suspension was completely dissolved, it was placed for 10 hours at room temperatures to obtain an aluminum-based Lewis acid substituted by two-fold by mol of 2,6-ditert-butyl-methylphenol (hereinafter, referred to as MeAlBMP) which is a white-colored crystalline.

The crystalline was washed twice with dried hexane, and dried in vacuo. The crystalline was employed without any treatments or as a dichloromethane solution containing 0.3 millimol/ml after weighing.

<Preparation Example 2: No. 2 preparation of an organic aluminum-based Lewis acid>

2,6-diphenylphenol (7.4 g, 30 millimol) was dissolved into 42.5 ml of dried toluene, and then 7.5 ml of 2.0 M toluene solution of trimethylaluminum was added dropwise at room temperatures to obtain an aluminum-based Lewis acid substituted by two-fold by mol of 2,6-diphenylphenol (hereinafter, referred to as MeAlDPP).

<Preparation Example 3: No. 3 preparation of an organic aluminum-based Lewis acid>

The same methods as described in Preparation Example 1 were repeated except that 7.5 ml of 2.0 M toluene solution (15 millimol) of trimethylaluminum and 2,4,6-trichlorophenol (5.93 g, 30 millimol) were employed to obtain an aluminum-based Lewis acid substituted by two-fold of 2,4,6-trichlorophenol (hereinafter, referred to as MeAlTCP).

<Preparation Example 4: No. 4 preparation of an organic aluminum-based Lewis acid>

2,6-ditert-butyl-4-methylphenol (4.4 g, 20 millimol) was dissolved into 30 ml of dried hexane, and then 20 ml of 0.5 M hexane solution of triisobutylaluminum was added dropwise at 0° C. to obtain an aluminum-based Lewis acid substituted by 2,6-ditert-butyl-4-methylphenol (hereinafter, referred to as iso-BuAlBmP).

<Example 1: Living polymerization of neopentyl glycol carbonate>

A round-bottom flask in which a magnetic stirrer is placed equipped with a three-way stop cock was charged with neopentyl glycol carbonate (2.60 g, 20 millimol), followed by purging with nitrogen gas inside. While streaming nitrogen gas, a dried dichloroethane (1.6 ml) and isopropyl alcohol (0.077 ml, 1 millimol) were added with a syringe and, further, there was added 1 ml of dichloromethane solution containing 0.3 millimol/ml of MeAlBMP obtained in Preparation Example 1, followed by stirring for 1 hour at room temperatures. Neopentyl glycol carbonate completely disappeared during stirring.

Reactant was supplied to 300 ml of methanol to obtain a white-colored precipitation. The white-colored precipitation was dried at reduced pressures to obtain 2.55 g of a carbonate polymer having number average molecular weight of 2,200 based on a standard Polystyrene and molecular weight distribution of 1.15 measured with a GPC.

FIG. 1 is an $^1$H-NMR chart related to the carbonate polymer. It was confirmed that 20-fold by mol of neopentyl glycol carbonate is added to isopropyl alcohol as charged.

<Example 2: No. 1 living polymerization of epsilon-caprolactone>

Figure 2:
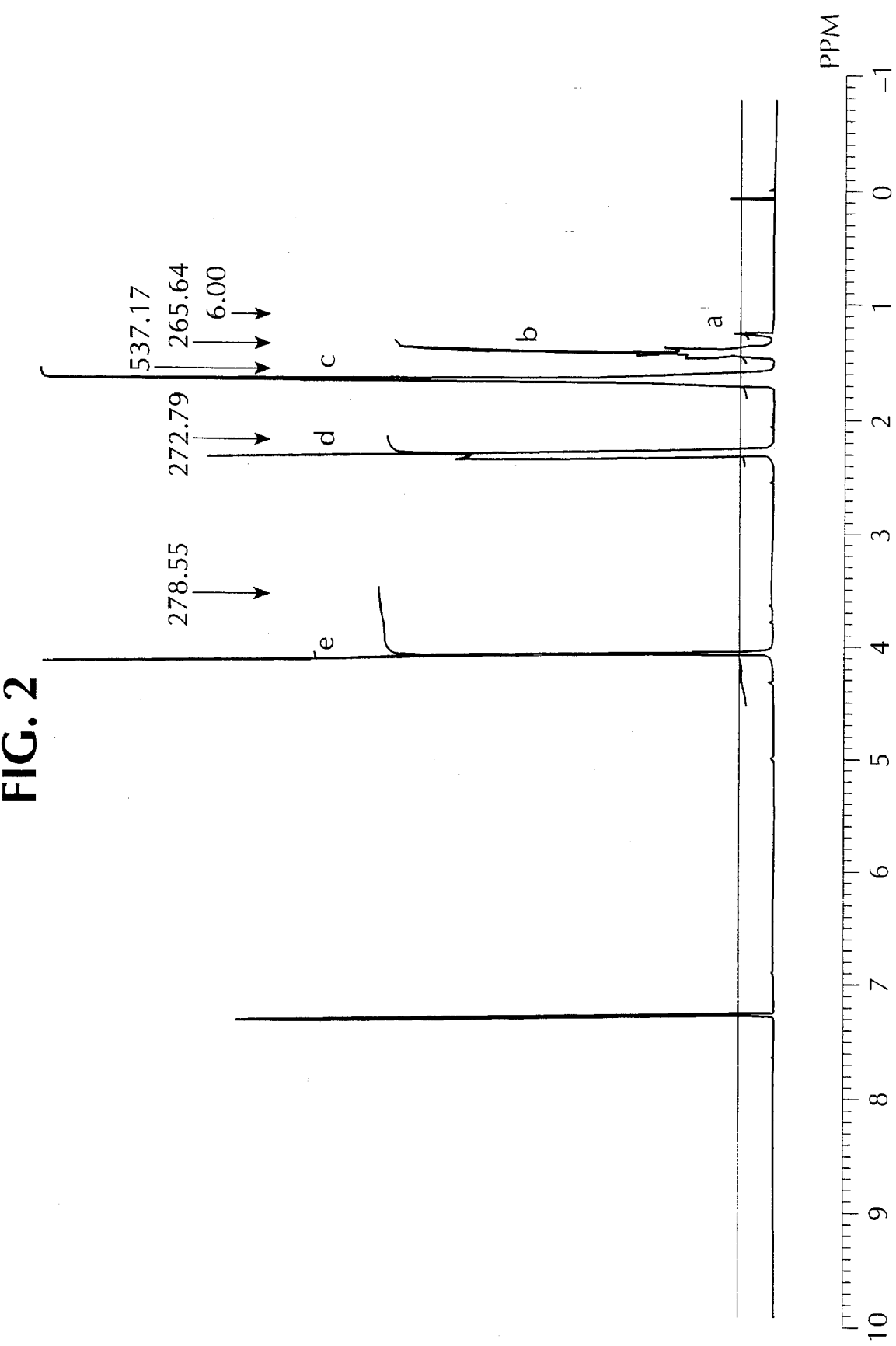
FIG. 2 is a $^1$H-NMR spectra chart related to the lactone polymer obtained in Example 2.

The same equipment as described in Example 1 was charged with epsilon-caprolactone (2.2 ml, 20 millimol) by the same methods. A dried dichloromethane (1.6 ml) and isopropyl alcohol (0.077 ml, 1 millimol) were added, and further there was added ml of a dichloromethane solution containing 0.3 millimol/ml of MeAlBMP, followed by polymerizing to obtain 2.10 g of a caprolactone polymer having a number average molecular weight of 5,400 based on a standard Polystyrene and molecular weight distribution of 1.15 measured with a GPC. FIG. 2 is an $^1$H-NMR chart related to the caprolactone polymer. It was confirmed that 20-fold by tool of epsilon-caprolactone is added to isopropyl alcohol as charged.

<Example 3: Preparation of neopentyl glycol carbonate-epsilon-caprolactone block copolymer>

The same equipment as described in Example 1 was charged with neopentyl glycol carbonate (6.5 g, 50 millimol), followed by purging with nitrogen gas. A dried dichloromethane (3 ml) and isopropyl alcohol (0.077 ml, 1 millimol) were added with a syringe while streaming nitrogen gas and, further, there was added 1 ml of a dichloromethane solution containing 0.3 millimol/ml of MeAlBMP, followed by stirring for 2.5 hours at room temperatures and sampling of a very minor amount to confirm the elimination of neopentyl glycol carbonate. Successively, ε-caprolactone (5.5 ml, 50 millimol) was added, followed by proceeding with copolymerization while stirring for 1.5 hours at room temperatures to obtain a reaction mixture.

The reaction mixture was supplied to 300 ml of methanol to obtain a white-colored precipitation, followed by drying it at reduced pressures to obtain 11.6 g of a block copolymer.

Figure 3:
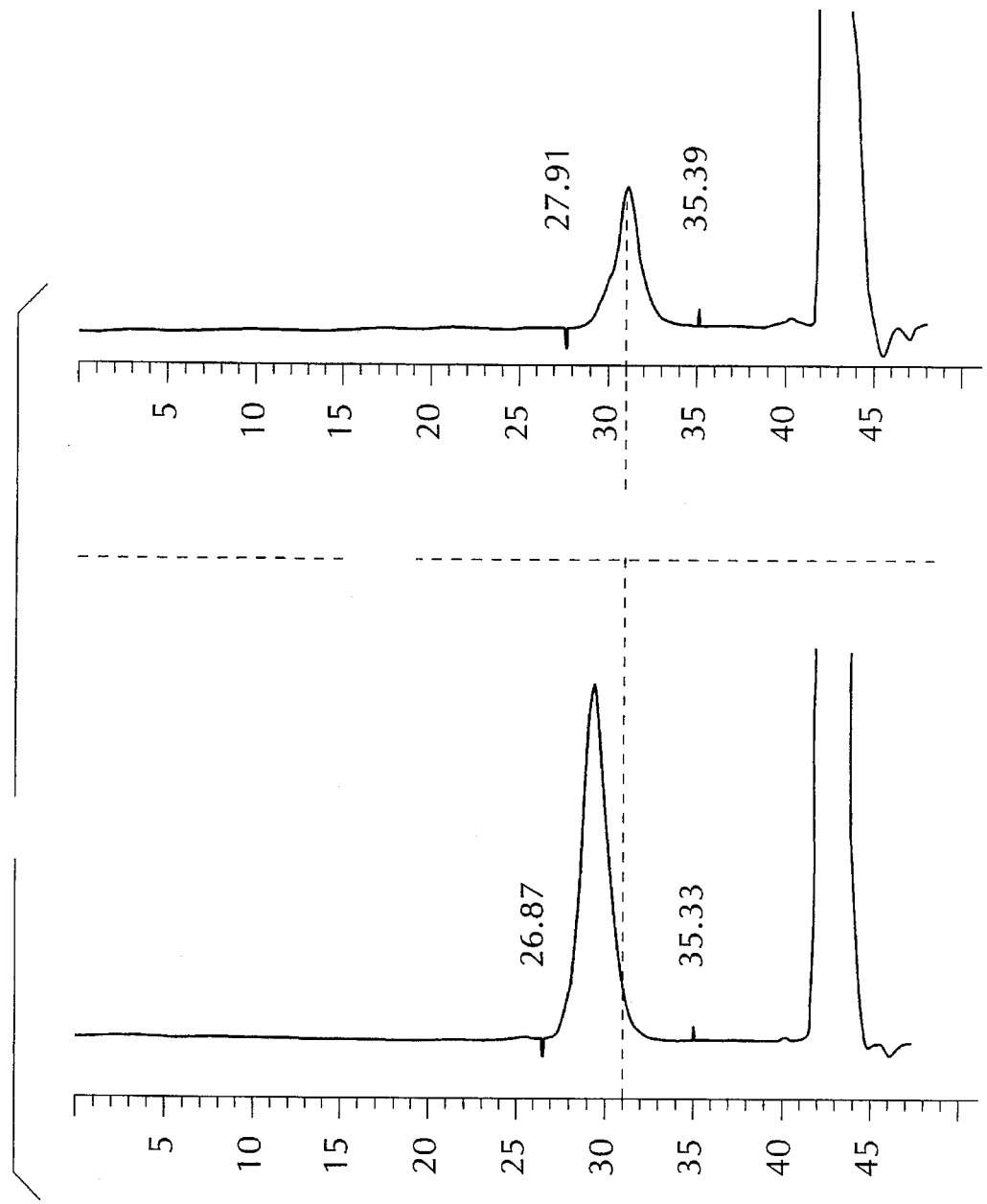
FIG. 3 is GPC charts related to the neopentyl glycol carbonate polymer and block copolymer obtained in Example 3.

FIG. 3 shows GPC chart related to the neopentyl glycol carbonate polymer which was obtained by sampling and the block copolymer produced. It was confirmed by the GPC chart that the molecular weight was increased by block copolymerization.

While the number average molecular weight in the former neopentyl glycol carbonate polymer is 6,200 and the molecular weight distribution is 1.18, the number average molecular weight in the block copolymer is 13,400 and the molecular weight distribution is 1.20.

Figure 4:
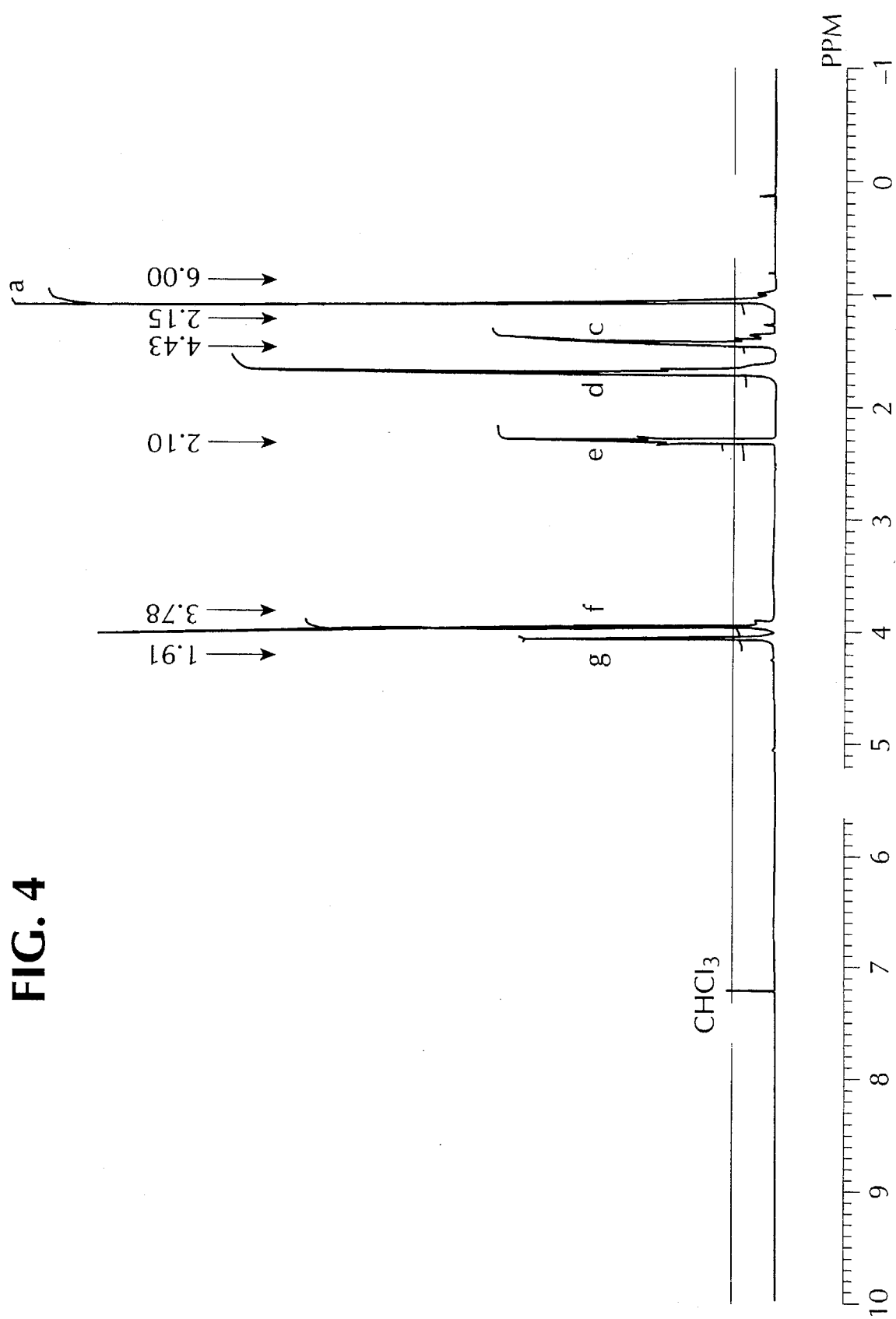
FIG. 4 is a $^1$H-NMR spectra chart related to the block copolymer obtained in Example 3.

FIG. 4 is an $^1$H-NMR chart related to the block copolymer, and shows that the molar ratio of isopropyl alcohol/neopentyl glycol carbonate/epsilon-caprolactone is 1.0/50.0/46.8.

<Example 4: No. 2 living polymerization of epsilon-caprolactone>

The same equipment as described in Example 1 was charged with epsilon-caprolactone (11.0 ml, 100 millimol), a dried dichloro-methane (3 ml), isopropyl alcohol (0.077 ml, 1 millimol), and 1 ml of a toluene solution containing 0.3 millimol/ml Of MeAlDPP prepared in Preparation Example 2, followed by stirring at room temperatures for 5 hours. ε-caprolactone completely disappeared during stirring.

The same operations as described in Example 1 were carried out to obtain 10.8 g of a lactone polymer having a number average molecular weight of 13,300 based on standard Polystyrene and the molecular weight distribution is 1.11 by a measurement with GPC.

<Example 5: Preparation of a monodispersed methacrylic-modified epsilon-caprolactone tetramer>

A 4-necked flask equipped with a tube for introducing air, a thermostat, a condenser, and a stirrer was charged with 2-hydroxyethylmethacrylate (130 g, 1 mol), epsilon-caprolactone (456.6 g, 4 mol), and 3 ml of 0.3 M-toluene solution of MeAlDPP prepared in Preparation Example 2, followed by stirring at 60° C. for 5 hours while streaming a dried air to obtain a dope. A GPC measurement was carried out related to the dope obtained, and the dope was diluted by toluene, and then the diluted dope was refined by separation with a silica-gel column and removal of solvent to obtain 582 g of a monodispersed methacrylic-modified epsilon-caprolactone tetramer.

Results of the GPC measurement are shown in Table 1.

<Comparative Example 1>

In order to make a comparison with Example 5, the same equipment, charging, and reaction conditions as described in Example 5 were applied, except that 3 ml of a toluene solution containing 0.3 M of monobutyltintris (2-ethylhexanate) was employed in place of the catalyst employed in Example 5 to prepare a monodispersed methacrylic-modified epsilon-caprolactone tetramer. It required 32 hours until the residual amount of epsilon-caprolactone attains to less than 1%. A GPC measurement was carried out related to the dope obtained.

Results of the GPC measurement are also shown in Table 1 together with the results related to the dope before refining in Example 5.

<Example 6: Preparation of a monodispersed acrylic-modified carbonate dimer>

The same equipment as described in Example 5 was charged with 2-hydroxyethylacrylate (116.1 g, 1 mol), propyleneglycol carbonate (204.1 g, 2 mol), and 5 ml of 0.3 M toluene solution of MeAlTCP obtained in Preparation Example 3, followed by stirring at 60° C. for 6 hours while streaming a dried air to obtain a dope. A GPC measurement was carried out related to the dope obtained, and the dope was diluted by toluene, and then the diluted dope was refined by separation with a silica-gel column and removal of solvent to obtain 314 g of a monodispersed acrylic-modified carbonate dimer. Results of the GPC measurement are shown in Table 2.

<Example 7: Preparation of a monodispersed polylactone diol>

The same equipment as described in Example 1 was charged with ethyleneglycol ( 31 g, 0.5 mol ), epsilon-caprolactone (970.2 g, 8.5 mol), and MeAlBMP (7.21 g, 15 millimol) prepared in Prepa-ration Example 1, followed by stirring at 65° C. for 6 hours while streaming a dried air to obtain a diol. A GPC measurement was carried out related to the diol obtained, and then 500 ml of methanol was added, followed by stirring while refluxing of methanol. 999.4 g of a monodispersed polylactone diol was obtained by separation of the methanol layer.

The results of GPC measurement are shown in Table 3.

<Comparative Example 2>

In order to make comparison with Example 7, the same equipment, charging, and reaction conditions as described in Example 7 were applied, except that tetrabutyltitanate (5.10 g, 15 millimol) was employed in place of the catalyst MeAlBMP (7.21 g, 15 millimol) employed in Example 7 to prepare a polylactone diol. It required 46 hours until the residual amount of epsilon-caprolactone attains to less than 1%. A GPC measurement was carried out related to the dope obtained.

The results of GPC measurement are also shown in Table 3 together with the results related to the dope before refining in Example 7.

<Example 8: Preparation of a monodispersed polylactone triol>

The same equipment as described in Example 1 was charged with trimethylol propane (67.1 g, 0.5 mol), delta-varelolactone (400.4 g, 4 mol), and MeAlBMP (4.81 g, 10 millimol) prepared in Preparation Example 1, followed by stirring at 65° C. for 4 hours while streaming a dried air to obtain a triol. A GPC measurement was carried out related to the triol obtained, and then 500 ml of methanol was added, followed by stirring while refluxing methanol. 459.7 g of a monodispersed polylactone triol was obtained by the separation of the methanol layer.

The results of GPC measurement are shown in Table 3.

<Example 9: Preparation of a monodispersed methacrylic-modified carbonate monomer>

The same equipment as described in Example 5 was charged with 2-hydroxyethylmethacrylate (260.3 g, 2 mol), neopentyl glycol carbonate (260.3 g, 2 mol), and 3 ml of 0.2 M hexane solution of iso-BuMeAlBMP obtained in Preparation Example 4, followed by stirring at 100° C. for 4 hours while introducing dried air to obtain a dope. A GPC measurement was carried out related to tile dope obtained. Results of the GPC measurement are shown in Table 2.

<Example 10: No. 3 living polymerization of epsilon-caprolactone>

Figure 5:
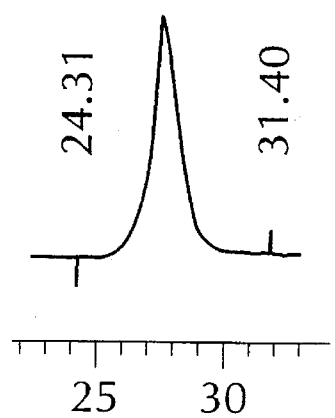
FIG. 5 is a GPC chart related to the block copolymer obtained in Example 10.

The same equipment as described in Example 1 was charged with epsilon-caprolactone (5.5 ml, 50 millimol) and 4 ml of a dichloromethane solution containing 0.025 millimol/ml of methanol by the same methods as described in Example 1, and then there was added 2.5 ml of 0.3 M dichloromethane solution of MeAlDPP obtained in Preparation Example 2, followed by stirring at room temperatures for 42 hours to obtain a reaction mixture. The reaction mixture was supplied into 300 ml of methanol to obtain a white-colored precipitation, followed by drying it at reduced pressures to obtain a polymer. The number average molecular weight of the polymer was 62,600 based on a standard Polystyrene and molecular weight distribution measured with a GPC was 1.14. FIG. 5 is a GPC chart related to the polymer.

<Example 11: No. 2 preparation of a neopentyl glycol carbonate-epsilon-caprolactone block copolymer>

The same equipment as described in Example 1 was charged with epsilon-caprolactone (5.5 ml, 50 millimol) and isopropyl alcohol (0.077 ml, 1 millimol) and dichloromethane (4 ml) with a syringe while streaming nitrogen gas, and further there was added 2.5 ml of 0.3 M dichloromethane solution of MeAlDPP prepared in Preparation Example 2, followed by stirring for 2.5 hours at room temperatures and sampling of a minor amount to confirm complete disappearance of epsilon-caprolactone. Successively, 10.4 ml of a dichloromethane solution containing neopentyl glycol carbonate (15.6 g, 130 millimol) was added, followed by stirring for 32 hours at room temperatures to obtain a reaction mixture. The reaction mixture was supplied into 300 ml of methanol to obtain a white-colored precipitation, followed by drying at reduced pressures to obtain a block copolymer.

Figure 6A:
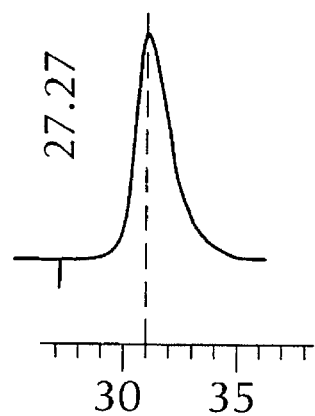
FIG. 6 is a GPC chart related to the lactone polymer in halfway sampling and a GPC chart related to the block copolymer obtained in Example 11.
Figure 6B:
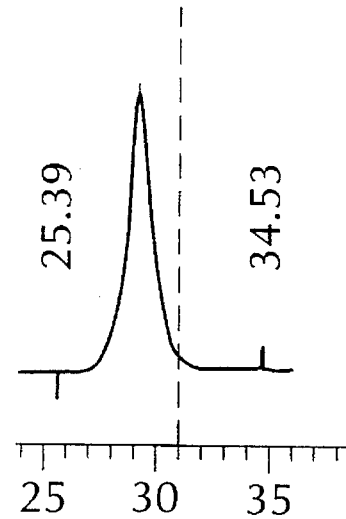

FIG. 6 shows a GPC chart related to the caprolactone polymer which was obtained by sampling and the block copolymer produced. It was confirmed by the GPC chart that the molecular weight increased by the block copolymerization. While the number average molecular weight in the former epsilon-caprolactone polymer is 6,400 and the molecular weight distribution is 1.19, number average molecular weight in the block copolymer is 20,000 and the molecular weight distribution is 1.17.

<Example 12: No. 1 preparation of a monodispersed neopentyl glycol carbonate-epsilon-caprolactone random copolymer>

The same equipment as described in Example 1 was charged with ethyleneglycol (18.6 g, 0.3 millimol), neopentyl glycol carbonate (195.2 g, 1.5 mol), epsilon-caprolactone (399.5 g, 3.5 mol). Successively, 10 ml of 0.2 M hexane solution of iso-BuAlBMP prepared in Preparation Example 4, followed by stirring at 150° C. for 2 hours while streaming a dried nitrogen gas to obtain a copolymer. A GPC measurement was carried out related to the copolymer obtained. The results of GPC measurement related to the copolymer obtained are shown in Table 3.

<Example 13: No. 2 preparation of a monodispersed neopentyl glycol carbonate-epsilon-caprolactone random copolymer>

The same equipment as described in Example 1 was charged with ethyleneglycol (18.6 g, 0.3 millimol), neopentyl glycol carbonate (65.1 g, 0.5 mol), epsilon-caprolactone (513.6 g, 4.5 mol) . Successively, 10 ml of 0. 5 M hexane solution of isoBuAlBMP prepared in Preparation Example 4, followed by stirring at 150° C. for 2 hours while streaming dried nitrogen gas to obtain a copolymer. A GPC measurement was carried out related to the copolymer obtained. Results of the GPC measurement related to the copolymer obtained are shown in Table 3.

<Application Example 1>

Respective crystallinity related to the (co)polymers obtained in Examples 7, 12, 13, and Comparative Example 2 was evaluated by the presence or absence of crystallinity after being placed at 0° C., 20° C., and 40° C., respectively, for 1 week.

Results are shown in Table 4.

TABLE 1

| Component | Component ratio (%) | |
|---|---|---|
| | Example 5 | Comparative Example 1 |
| 2-hydroxyethylmethacrylate | — | 1.5 |
| epsilon-caprolactone monomer methacrylic-modified- | 0.4 | 0.8 |
| epsilon-caprolactone monomer | 1.1 | 3.6 |
| epsilon-caprolactone dimer | 4.6 | 8.9 |
| epsilon-caprolactone trimer | 14.8 | 19.3 |
| epsilon-caprolactone tetramer | 60.0 | 28.1 |
| epsilon-caprolactone pentamer | 13.3 | 25.4 |
| epsilon-caprolactone oligomers not less than hexamer | 5.6 | 12.0 |
| other components | 0.2 | 0.4 |

In Table 1, component ratio (%) is represented by the area percent (%) of a peak by dope before refining minus a peak by toluene.

TABLE 2

| Component | Component ratio | |
|---|---|---|
| | Example 6 | Example 9 |
| 2-hydroxyethylmethacrylate carbonate monomer acrylic-modified- | 5.2 0.5 | 5.8 0.3 |
| carbonate monomer | 16.7 | 76.1 |
| carbonate dimer | 68.6 | 13.8 |
| carbonate trimer | 7.5 | 3.6 |
| carbonate tetramer | 1.0 | 0.4 |
| other components | 0.5 | |

In Table 2, component ratio (%) is represented by the area percent (%) of a peak by dope before refining minus a peak by toluene.

TABLE 3

| | Example | | | | Comparative Example |
|---|---|---|---|---|---|
| Results by GPC | 7 | 8 | 12 | 13 | 2 |
| NAMW of Polymer | 3260 | 1365 | 3890 | 4400 | 2970 |
| MWD of Polymer | 1.08 | 1.15 | 1.23 | 1.16 | 1.64 |
| Residual lactone monomer (%) | 0.4 | 0.2 | 0.1 | 0.1 | 0.7 |
| Dimer content (%) of cyclic lactone | — | — | — | — | 0.6 |

In Table 3, NAMW represents the number average molecular weight, and MWD represents the molecular weight distribution.

TABLE 4

| | Temperature | | |
|---|---|---|---|
| | 0° C. | 20° C. | 40° C. |
| Example 7 | WCS | WCS | WCS |
| 12 | TL | TL | TL |
| 13 | WCS | WCS | TL |
| Comparative Example 2 | WCS | WCS | WCS |

In Table 4, WCS means "white-colored solid" and TL means "transparent liquid".

Table 4 clearly shows that when the ratio of neopentyl glycol carbonate with respect to epsilon-caprolactone is larger, crystallinity in the (co)polymers is more reduced, and crysta-llinity in the (co)polymers does not so much depend upon catalysts.

It is generally to be noted that a polyol (for example, a polylactonediol or carbonatediol, etc.) which is a starting material for polyurethanes is preferably employed in the state of a liquid or a solid having a low melting point from the viewpoint of workability during the preparation of polyurethanes.

While the invention has been described in detail and with reference to specific embodiments thereof, it will be apparent to one skilled in the art that various changes and modifications can be made therein without departing from the spirit and scope thereof.

What is claimed is:

1. A process for the preparation of any one of a monodispersed lactone polymer, a monodispersed carbonate polymer, and a monodispersed lactone-carbonate copolymer which comprises: adding a ring-opening initiator to a lactone monomer, a cyclic carbonate monomer, or a lacteone monomer and a cyclic carbonate monomer in a ring-opening addition reaction in the presence of an organic aluminum-based Lewis acid represented by general formula (I),

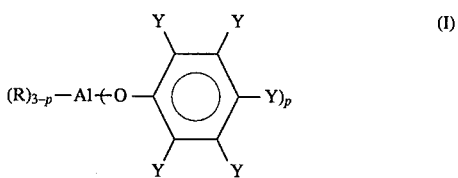

wherein R is an alkyl group having a carbon number ranging from 1 to 4, Y is independently selected from a hydrogen, an alkyl group, an aryl group, a halogen, a trimethylsilyl group and a trimethylgelmil group, and p is any one of 1, 2, and 3.

2. A process for the preparation of a monodispersed polymer or copolymer as set forth in claim 1, wherein said organic aluminum-based Lewis acid is represented by general formula (II),

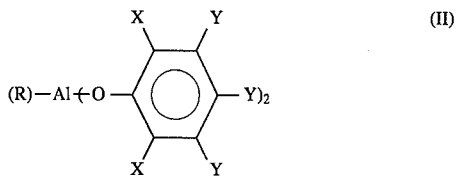

wherein R is an alkyl group having a carbon number ranging from 1 to 4, X is independently selected from tert-butyl group, phenyl group, chlorine, bromine, and iodine, Y is independently selected from a hydrogen, an alkyl group, an aryl group, a halogen, a trimethylsilyl group and a trimethylgelmil group.

3. A process for the preparation of a monodispersed polymer or copolymer as set forth in claim 1, wherein said organic aluminum-based Lewis acid is a phenols-substituted aluminum.

4. A process for the preparation of a monodispersed polymer or copolymer as set forth in claim 1, wherein said ring-opening initiator is a polyvalent alcohol having from 2 to 10 hydroxyl groups.

5. A process for the preparation of a monodispersed polymer or copolymer as set forth in claim 1, wherein said ring-opening initiator is a compound having one radically polymerizable double bond together with one hydroxyl group.

6. A process for the preparation of a monodispersed polymer or copolymer as set forth in claim 1, wherein said lactone monomer is epsilon-caprolactone.

7. A monodispersed (co)polymer having a plurality of hydroxyl groups represented by general formula (III),

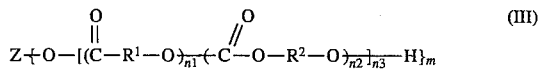

wherein $R^1$ is

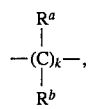

k is an integer ranging from 4 to 8, $R^a$ and $R^b$ are an independent hydrogen or methyl group, and $R^2$ is an alkylene group having a carbon number ranging from 1 to 10, n 1 and n2 are an integer ranging from 0 to 100 which are not simultaneously 0, n3 is an integer ranging from 1 to 10, m is an integer ranging from 2 to 10, and z is a residual group of a polyvalent alcohol having the functionality of m, wherein the polyvalent alcohol is ethylene glycol, diethyleneglycol, butanediol, hexamethylene glycol, neopentyl glycol, trimethylol propane, pentaerythritol, polyvinylalcohol, 2-hydroxybutyl (meth) acrylate polymer. 2-hydroxybutyl (meth) acrylate-modified polymer, and an adduct of ethylene oxide to bisphenol A.

8. A monodispersed (co)polymer as set forth in claim 7, wherein said lactone monomer is epsilon-caprolactone.

9. A (meth)acrylic-modified monodispersed lactone polymer, (meth)acrylic-modified monodispersed carbonate polymer, or a (meth)acrylic-modified monodispersed lactone-carbonate copolymer having one hydroxyl group represented by general formula (IV),

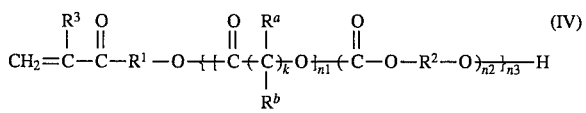

wherein $R^3$ is a hydrogen or methyl, $R^a$ and $R^b$ are independent hydrogen or a methyl group, k is an integer ranging from 4 to 8, $R^1$ and $R^2$ are an alkylene group having a carbon number ranging from 1 to 10, n 1 and n2 are an integer ranging from 0 to 100 which are not simultaneously 0, and n3 is an integer ranging from 1 to 10.

10. A (meth)acrylic-modified monodispersed lactone polymer, (meth)acrylic-modified monodispersed carbonate polymer, or a (meth)acrylic-modified monodispersed lactone-carbonate copolymer as set forth in claim 9, wherein said lactone monomer is epsilon-caprolactone.

* * * * *